(12) United States Patent
Fok

(10) Patent No.: US 7,907,215 B2
(45) Date of Patent: Mar. 15, 2011

(54) VIDEO ENHANCEMENT SYSTEMS AND METHODS

(75) Inventor: Stanley Fok, Mississauga (CA)

(73) Assignee: Sigma Designs, Inc., Milpitas, CA (US)

( * ) Notice: Subject to any disclaimer, the term of this patent is extended or adjusted under 35 U.S.C. 154(b) by 1114 days.

(21) Appl. No.: 11/447,468

(22) Filed: Jun. 6, 2006

(65) Prior Publication Data

US 2007/0279530 A1 Dec. 6, 2007

(51) Int. Cl.
*H04N 5/21* (2006.01)
*H04N 5/14* (2006.01)

(52) U.S. Cl. .................. 348/625; 348/630; 348/671

(58) Field of Classification Search ............... 348/625, 348/606, 607, 624, 630, 671, 673, 678, 679, 348/708, 707; 382/254, 260, 263, 266, 270, 382/272, 275; *H04N 5/21, 5/14, 5/52, 9/64*
See application file for complete search history.

(56) References Cited

U.S. PATENT DOCUMENTS

| | | | |
|---|---|---|---|
| 4,399,461 A | 8/1983 | Powell | |
| 5,374,963 A | 12/1994 | Willis | |
| 5,606,375 A | 2/1997 | Lee | |
| 6,002,447 A | 12/1999 | Rumreich et al. | |
| 6,008,862 A | 12/1999 | Bellers | |
| 6,115,078 A | 9/2000 | Kino | |
| 6,148,116 A | 11/2000 | Park et al. | |
| 6,229,578 B1 | 5/2001 | Acharya et al. | |
| 6,330,038 B1 | 12/2001 | Johnson | |
| 6,363,526 B1 | 3/2002 | Vlahos et al. | |
| 6,384,872 B1 | 5/2002 | Tsui et al. | |
| 6,424,752 B1 | 7/2002 | Katayama et al. | |
| 6,611,296 B1 | 8/2003 | Nieuwenhuizen et al. | |
| 6,628,842 B1 | 9/2003 | Nagao | |
| 6,775,420 B2 | 8/2004 | Daly | |
| 6,795,083 B2 | 9/2004 | Bao et al. | |
| 6,816,193 B1 | 11/2004 | Kohashi et al. | |
| 6,873,373 B2 | 3/2005 | Yamaki | |
| 7,400,775 B2 * | 7/2008 | Ikeda et al. | 382/254 |
| 7,453,504 B2 * | 11/2008 | Ikeda | 348/252 |
| 2002/0047933 A1 | 4/2002 | Vlahos et al. | |
| 2002/0135702 A1 | 9/2002 | Yamaki | |
| 2002/0196355 A1 | 12/2002 | Hiroshige et al. | |

(Continued)

FOREIGN PATENT DOCUMENTS

EP 1521478 4/2005

(Continued)

OTHER PUBLICATIONS

U.K. Search Report, dated Sep. 5, 2007.

(Continued)

*Primary Examiner* — Sherrie Hsia
(74) *Attorney, Agent, or Firm* — Jones Day

(57) ABSTRACT

In accordance with the teachings described herein, systems and methods are provided for enhancing the image quality of video. One or more filters may be used to filter a received video signal to generate a vertical filtered output, a horizontal filtered output and a diagonal filtered output. One or more amplification components may be used to apply separate gains to each of the vertical, horizontal and diagonal filtered outputs to generate a vertical enhancement signal, a horizontal enhancement signal and a diagonal enhancement signal. One or more summation components may be used to combine the vertical, horizontal and diagonal enhancement signals with the video signal to generate an enhanced video signal.

62 Claims, 7 Drawing Sheets

U.S. PATENT DOCUMENTS

| | | |
|---|---|---|
| 2003/0048385 A1 | 3/2003 | Tomizawa et al. |
| 2005/0078224 A1 | 4/2005 | Ikeda |
| 2005/0100240 A1 | 5/2005 | Ikeda et al. |
| 2005/0140829 A1 | 6/2005 | Uchida et al. |
| 2005/0157213 A1 | 7/2005 | Takahashi |
| 2005/0248687 A1 | 11/2005 | Lee et al. |
| 2006/0001775 A1 | 1/2006 | Miyazawa |

FOREIGN PATENT DOCUMENTS

| | | |
|---|---|---|
| JP | 09-311937 | 12/1997 |
| JP | 09-319869 | 12/1997 |
| JP | 10322573 | 4/1998 |
| JP | 2000011153 | 1/2000 |
| JP | 2002344746 A | 11/2002 |
| JP | 2004357243 | 12/2004 |
| JP | 2005109991 A | 4/2005 |
| JP | 2005142832 A | 6/2005 |
| JP | 2005326437 | 11/2005 |
| JP | 2006094419 | 4/2006 |

OTHER PUBLICATIONS

Translation of Office Action from Chinese Patent Application No. 2007101088541, dated Jun. 6, 2008, 5 pages.

English translation of a Taiwanese Office Action, issued Sep. 29, 2010, for Taiwanese Patent Application No. 096119008.

* cited by examiner

VIDEO ENHANCEMENT SYSTEMS AND METHODS

FIELD

The technology described in this patent document relates generally to the fields of image processing, video and graphics. More particularly, the patent document describes video enhancement systems and methods.

BACKGROUND AND SUMMARY

The image quality of many video sources is low and not subjectively sharp. This can be the result of various factors, such as poor initial recording, video compression low-pass filtering, and/or other post processing. In accordance with the teachings described herein, systems and methods are provided for enhancing the image quality of video. One or more filters may be used to filter a received video signal to generate a vertical filtered output, a horizontal filtered output and a diagonal filtered output. One or more amplification components may be used to apply separate gains to each of the vertical, horizontal and diagonal filtered outputs to generate a vertical enhancement signal, a horizontal enhancement signal and a diagonal enhancement signal. One or more summation components may be used to combine the vertical, horizontal and diagonal enhancement signals with the video signal to generate an enhanced video signal.

DETAILED DESCRIPTION

Figure 1:
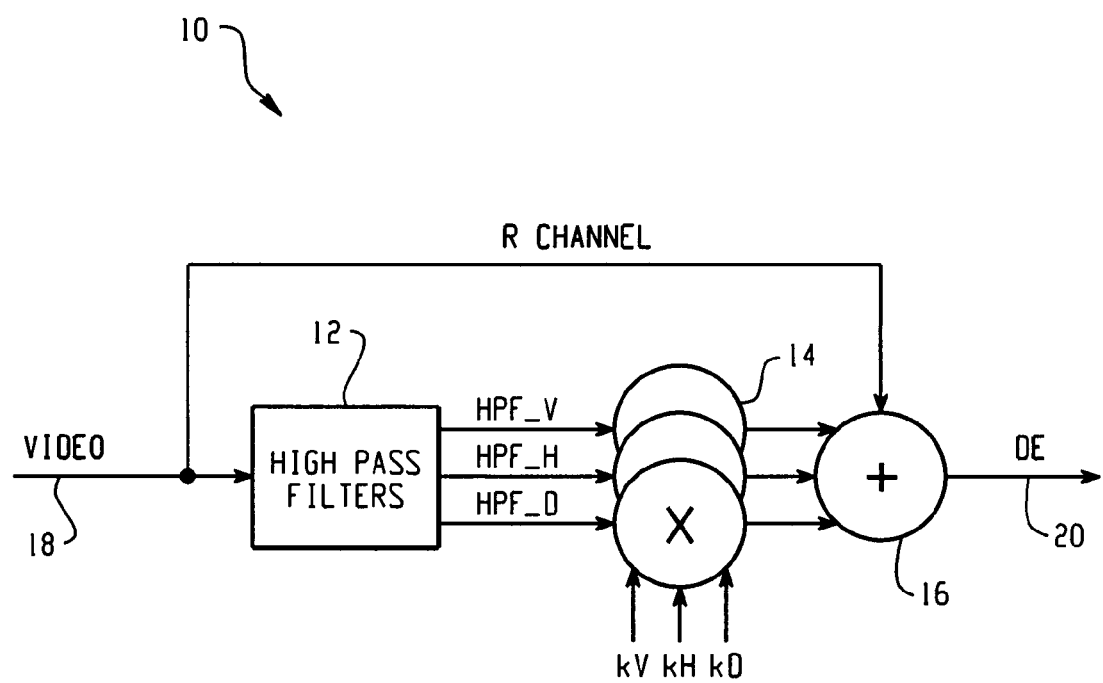
FIG. 1 is a block diagram of an example video enhancement system.

FIG. 1 is a block diagram of an example video enhancement system 10. The system 10 includes one or more filters 12, one or more amplification components 14, and one or more summation components 16. The filters 12 receive a video signal 18 and filter the video signal to generate a vertical filtered output (HPF_V), a horizontal filtered output (HPF_H) and a diagonal filtered output (HPF_D). The filters 12 may, for example, include a bank of directional high-pass filters. The amplification components 14 apply separate gains (kV, kH and kD) to each of the vertical, horizontal and diagonal filtered outputs to generate a vertical enhancement signal, a horizontal enhancement signal and a diagonal enhancement signal, respectively. The vertical, horizontal and diagonal gains (kV, kH and kD) may be determined based on one or more user inputs, and control the amount of amplification/enhancement that is applied to the filtered outputs (HPF_V, HPF_H and HPF_D). The vertical, horizontal and diagonal enhancement signals are then combined with the video signal 18 by one or more summation components 16 to generate an enhanced video signal 20.

Figure 2:
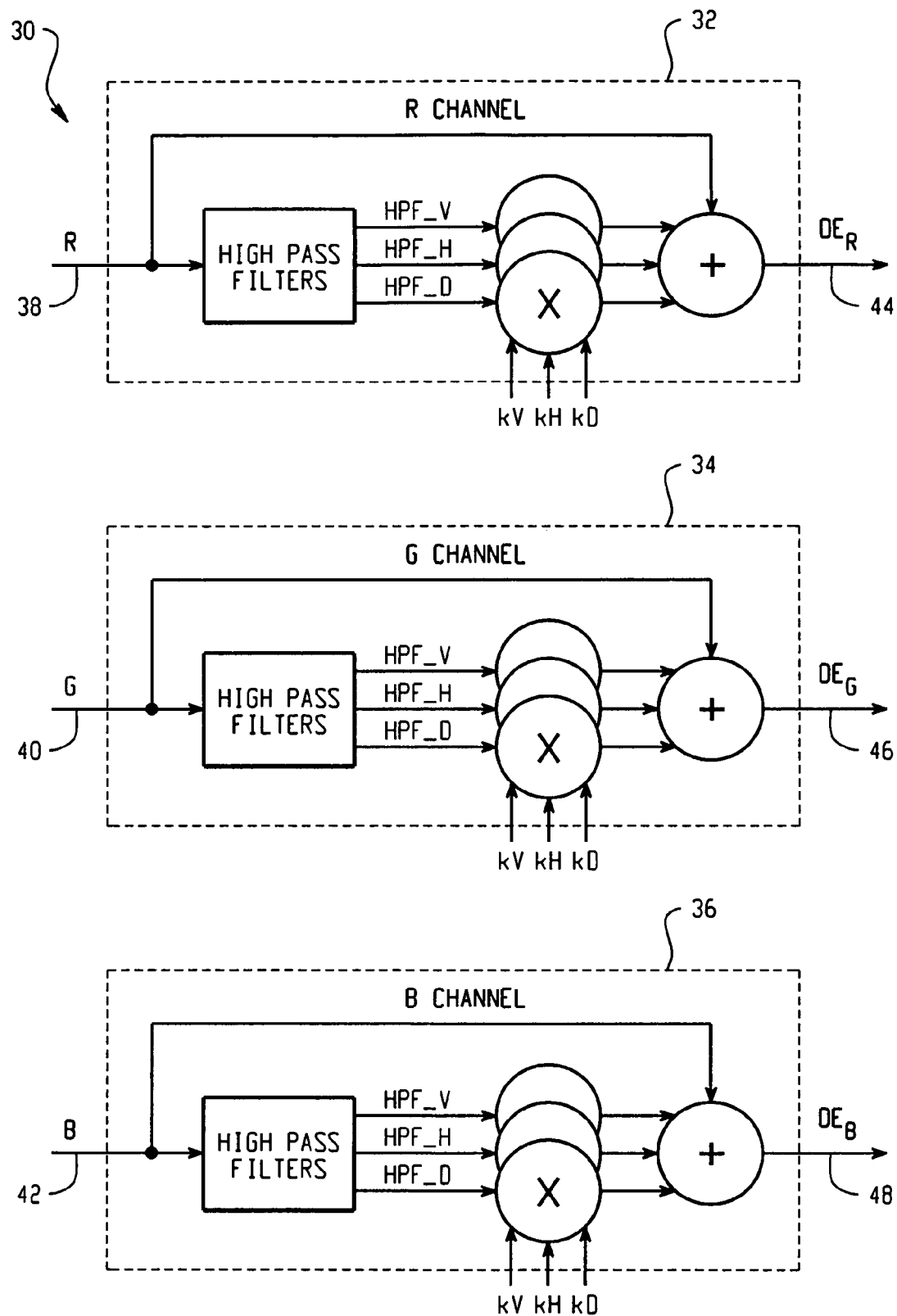
FIG. 2 is a block diagram of an example video enhancement system having red, green and blue channels.

FIG. 2 is a block diagram of an example video enhancement system 30 having red (R), green (G) and blue (B) channels 32, 34, 36 that respectively receive red (R) 38, green (G) 40 and blue (B) 42 components of a video signal. Each channel (R, G and B) 32, 34, 36 filters the received component signal (R, G or B) to generate vertical, horizontal and diagonal filtered outputs (HPF_V, HPF_H and HPF_D), and applies separate gains (kV, kH and kD) to each of the vertical, horizontal and diagonal filtered outputs. As illustrated, all three channels (R, G and B) may receive the same vertical, horizontal and diagonal gain control signals (kV, kH and kD), which are generated based on one or more user inputs. The enhanced vertical, horizontal and diagonal signals for each channel are combined with the respective R, G and B component signals 38, 40, 42 to generate an enhanced R channel video signal ($DE_R$) 44, an enhanced G channel video signal ($DE_G$) 46 and an enhanced B channel video signal ($DE_B$) 48.

Figure 3:
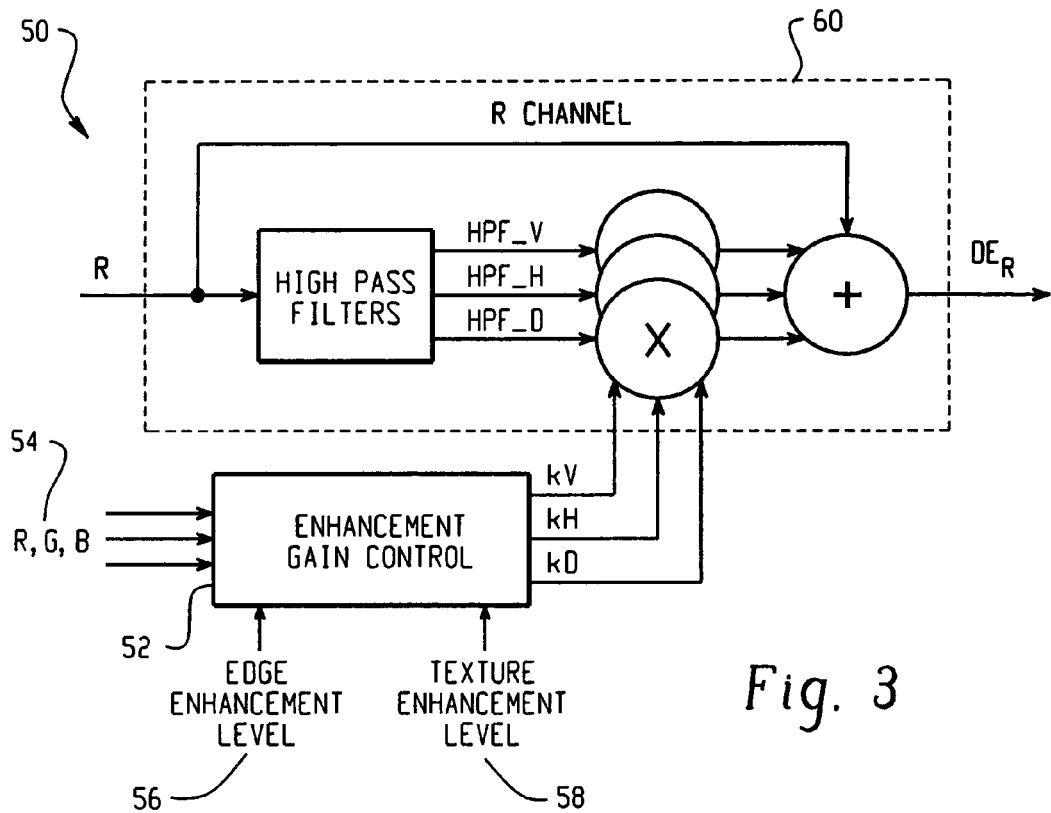
FIG. 3 is a block diagram of an example video enhancement system having an enhancement gain control element.

FIG. 3 is a block diagram of an example video enhancement system 50 having an enhancement gain control element 52. The enhancement gain control element 52 generates the gain control signals (kV, kH and kD) as a function of the R, G and B video components 54 and edge enhancement and texture enhancement level inputs 56, 58. The enhancement gain control element 52 performs a contrast calculation to classify portions (e.g., pixels) of the video image 54 as either edge portions or texture portions. For example, a pixel having a high contrast may be classified as an edge pixel, and a pixel having a low contrast may be classified as a texture pixel. The edge enhancement level 56 and texture enhancement level 58 inputs enable a user to specify the amount of gain applied to edge portions of the video image 54 independent of the amount of gain applied to the texture portions of the video image 54.

Only the R channel 60 is shown in FIG. 3 for simplicity. It should be understood, however, that the gain control signals (kV, kH and kD) generated by the enhancement gain control element 52 may also be input to G and B channels, for example as illustrated in FIG. 2.

Figure 4:
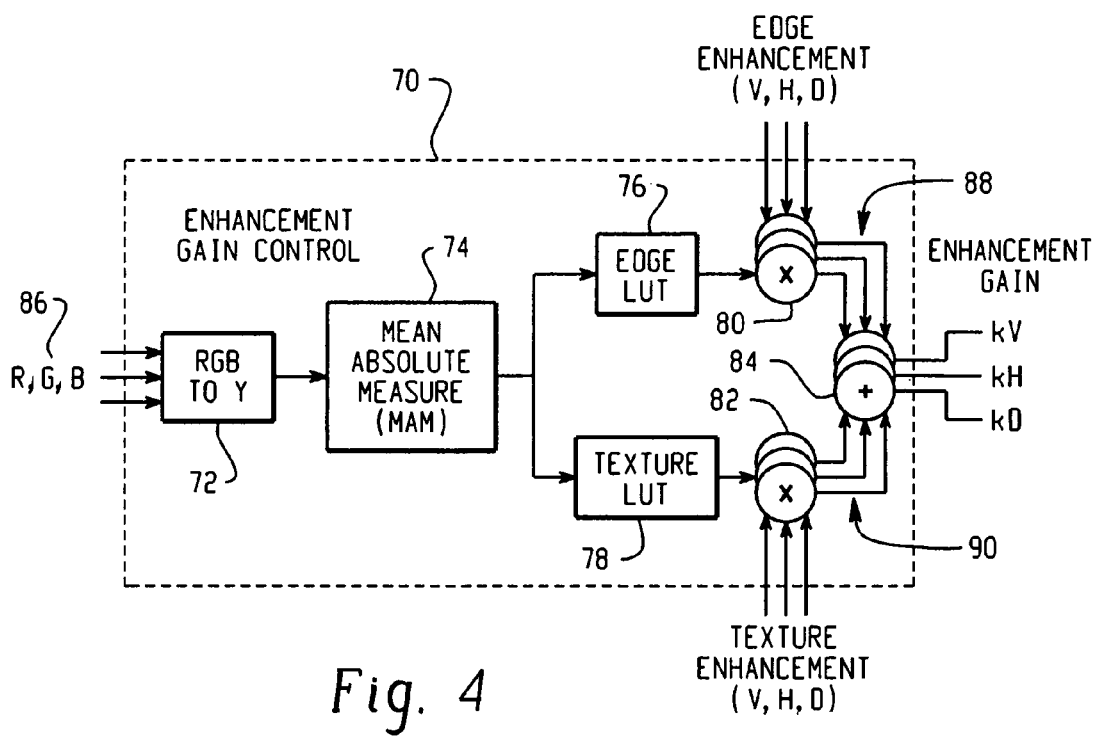
FIG. 4 is a block diagram of an example enhancement gain control element.

FIG. 4 is a block diagram of an example enhancement gain control (EGC) element 70. The EGC element 70 includes an RGB to grayscale (Y) converter 72, a mean absolute measure (MAM) calculation element 74, an edge look-up table (LUT) 76 and a texture look-up table (LUT) 78. Also included are two amplification components 76, 78 and a summation component 84. The RGB to Y converter 72 converts an RGB video input 86 into a simplified grayscale signal, which is input to the MAM calculation element 74. The MAM calculation element 74 calculates a contrast measure for each pixel of the grayscale signal, and the edge and texture LUTs 76, 78 are used to classify the pixels as either edge pixels or texture pixels based on the MAM calculation. For example, the edge LUT 76 may specify that pixels having MAM measures above a predetermined value are edge pixels, and the texture LUT 78 may specify that pixels having MAM measures below a predetermined value are texture pixels. The parameters used by the LUTs 76, 78 may, for example, be determined through experimentation and stored in a memory device, may be programmable by a user, or may be both stored in memory and programmable.

The edge enhancement amplification component 80 receives three edge enhancement gain settings: a vertical setting, a horizontal setting and a diagonal setting. The edge enhancement gain settings are applied to the edge pixels to generate vertical, horizontal and vertical edge enhanced signals 88. Similarly, the texture enhancement amplification component 82 receives vertical, horizontal and diagonal texture enhancement gain settings, which are applied to the texture pixels to generate vertical, horizontal and vertical texture enhanced signals 90. The edge and texture enhanced signals 88, 90 are combined with the summation component 84 to generate the vertical, horizontal and diagonal gain control signals (kV, kH and kD).

Figure 5:
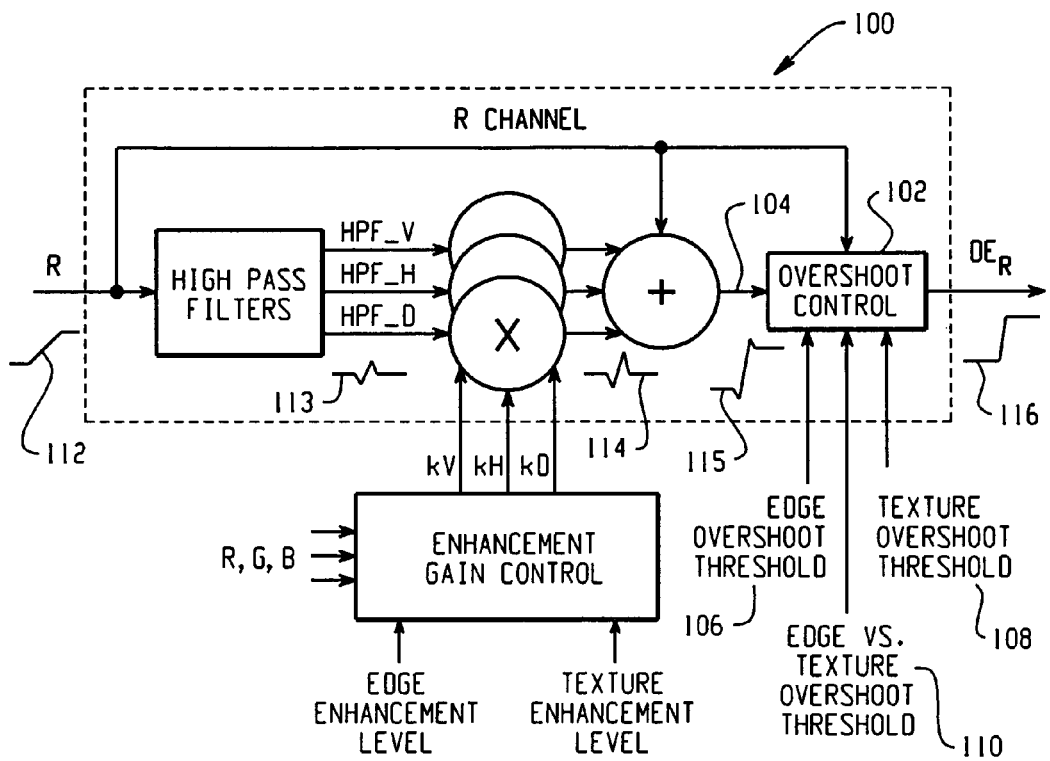
FIG. 5 is a block diagram of an example video enhancement system having an overshoot control element.

FIG. 5 is a block diagram of an example video enhancement system 100 having an overshoot control element 102. Only the R channel is shown in FIG. 5 for simplicity. In this example, the enhanced video signal 104 is input to the overshoot control element 102, which controls the amount of allowable overshoot or undershoot based on edge, texture and edge/texture parameters 106, 108, 110. The overshoot control operates to filter any portions of the enhanced video signal that are in excess of threshold values that are calculated based on the edge, texture and/or edge/texture parameter settings 106, 108, 110. As an example, FIG. 5 includes signal traces 112-116 at five points in the system to demonstrate how the overshoot control element 102 may operate.

Figure 6:
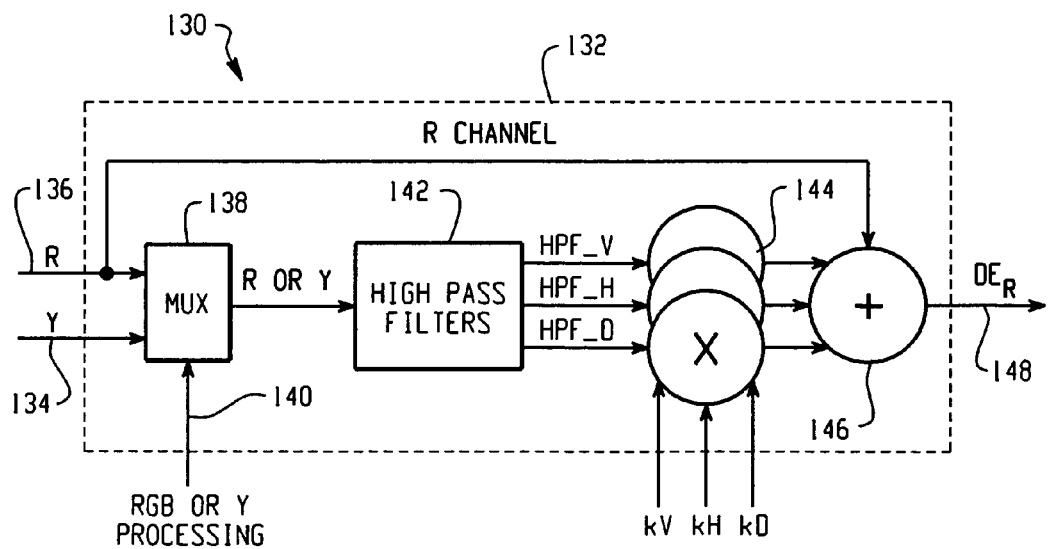
FIG. 6 is a block diagram of an example video enhancement system with optional RGB or grayscale (Y) processing.

FIG. 6 is a block diagram of an example video enhancement system 130 with optional RGB or Y processing. Only the R channel is shown in FIG. 6 for simplicity. In this example, the channel processor 132 receives both a grayscale (Y) signal 134 and an R, G or B component signal 136 as inputs. The Y signal may, for example, be provided by an enhancement gain control element, as shown in FIG. 4. The option to select the grayscale image (Y) for processing may be desired because of concerns that detail enhancement on RGB may cause color shifts on certain types of images.

In operation, one of the Y signal 134 or the R, G or B component signal 136 is selected for processing using a multiplexer 138 that is controlled by a user input 140. The selected Y or RGB signal is filtered with one or more high pass filters 142 to generate vertical, horizontal and diagonal filtered outputs (HPF_V, HPF_H and HPF_D), and separate gains (kV, kH and kD) are applied to each of the vertical, horizontal and diagonal filtered outputs by one or more amplification elements 144. The enhanced vertical, horizontal and diagonal signals are combined with the R, G or B component signal 136 by one or more summation components 146 to generate an enhanced channel video signal ($DE_R$) 148.

Figure 7:
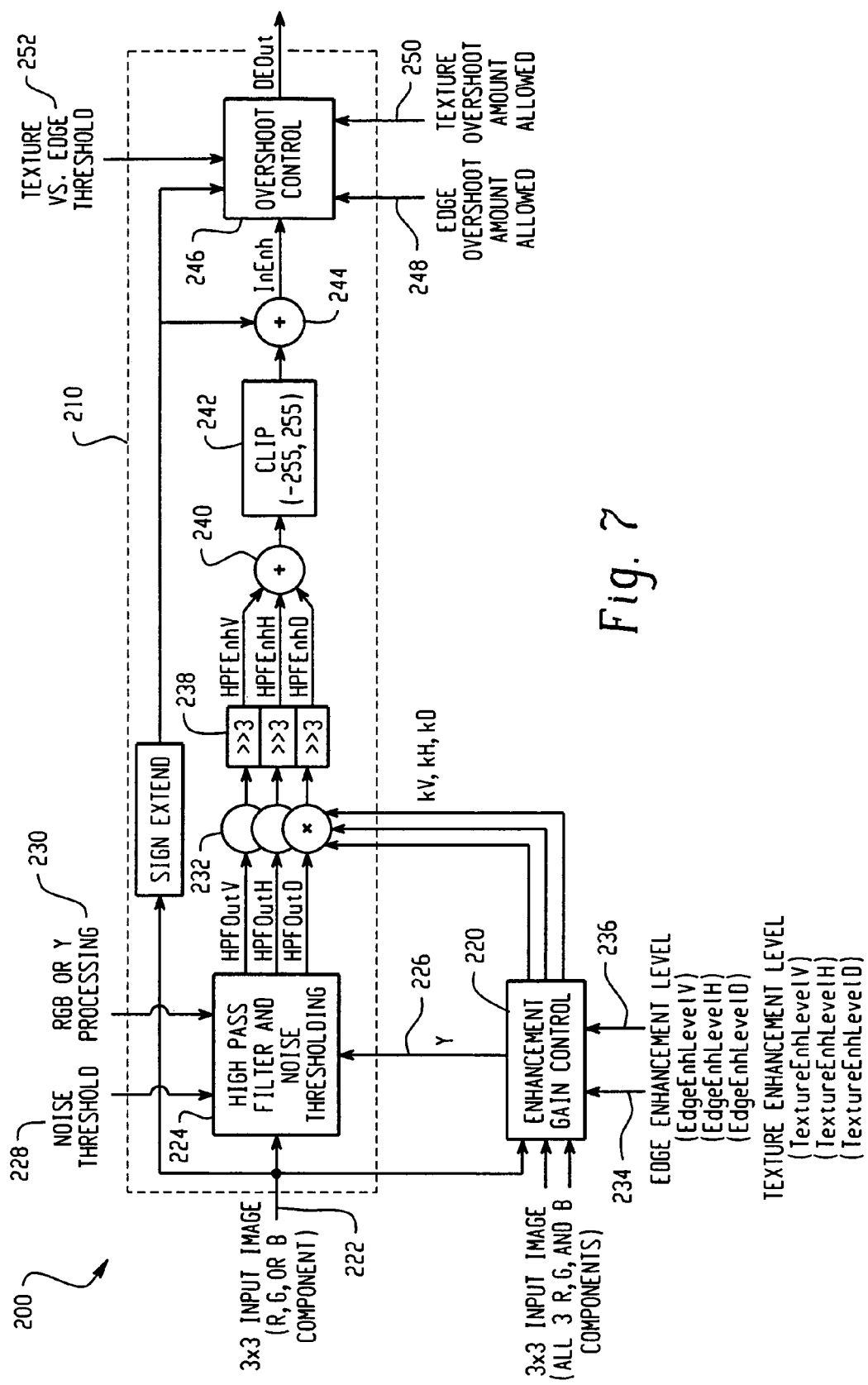
FIG. 7 is a block diagram of another example video enhancement system.

FIG. 7 is a block diagram of another example video enhancement system. The system includes three RGB channel processors 210 and an enhancement gain control element 220. Only a single RGB channel processor 210 is shown in FIG. 7 for simplicity. However, the enhancement gain control element 220 may also be coupled to two additional RGB channel processors.

The three channel processors 210 each receive one of an R, G or B video component 222, which is input to a high pass filter and noise thresholding element 224. The high pass filter and noise thresholding element 224 also receives a grayscale (Y) image 226 from the enhancement gain control element 220 and noise threshold 228 and RGB or Y selection 230 inputs. The RGB or Y selection input 230 selects one of the video component input 222 or the grayscale (Y) image 226 for processing. The selected image (RGB or Y) is high pass filtered and thresholded to reject noise to generate vertical, horizontal and diagonal filtered outputs (HPF_V, HPF_H and HPF_D). A more detailed diagram of an example high pass filter and noise thresholding element 224 is described below with reference to FIG. 8.

Separate gains are applied to each of the vertical, horizontal and diagonal filtered outputs (HPF_V, HPF_H and HPF_D) by one or more amplification components 232 based on gain control signals (kV, kH, kD) received from the enhancement gain control element 220. The enhancement gain control element 220 generates the gain control signals (kV, kH, kD) as a function of vertical, horizontal and diagonal edge and texture enhancement inputs 234, 236. A more detailed diagram of an example enhancement gain control element 220 is described below with reference to FIG. 9.

The vertical, horizontal and diagonal enhancement signals are bit shifted 238 and combined by a first summation element 240. The combined enhancement signal is clipped 242 to limit its bit width and is combined with the R, G or B component video signal 222 by a second summation element 244. The enhanced video signal (InEnh) is input to an overshoot control element 246, which controls the amount of allowable overshoot or undershoot based on edge, texture and edge/texture parameters to generate the enhanced component video signal (DEOut).

The overshoot control element 246 receives edge overshoot 248 and texture overshoot 250 user settings and a texture v. edge parameter 252, which are used to specify how much overshoot/undershoot is allowed compared to the local maximums and local minimums. In addition, the local maximums and local minimums are calculated for each pixel in the R, G or B component signal 222. From this data, the maximum and minimum overshoot/undershoot may be determined, for example using the following algorithm.

```
if (MAM >= TextureOrEdgeThres)
{
    maxvalue = min(1023, max(local_window) + EdgeOSLevel)
    minvalue = max(0, min(local_window) – EdgeOSLevel)
}
else
{
    maxvalue = min(1023, max(local_window) + TextureOSLevel)
    minvalue = max(0, min(local_window) – TextureOSLevel)
}
```

In the above algorithm, "TextureOrEdgeThres" is the texture v. edge threshold parameter 252, "EdgeOSLevel" is the edge overshoot input 248, "TextureOSLevel" is the texture overshoot input 250, max(local_window) is the local maximum and min(local_window) is the local minimum. The enhanced component video signal (DEOut) may be generated by clipping the enhanced video signal (InEnh) between the "maxvalue" and "minvalue" parameters calculated using the above algorithm.

The texture v. edge threshold parameter 252 may, for example, have a default value of 20, but may be programmable for flexibility. The overshoot control element 246 could also be used to simulate LTI/CTI by setting the edge and texture overshoot inputs 248, 250 near zero.

Figure 8:
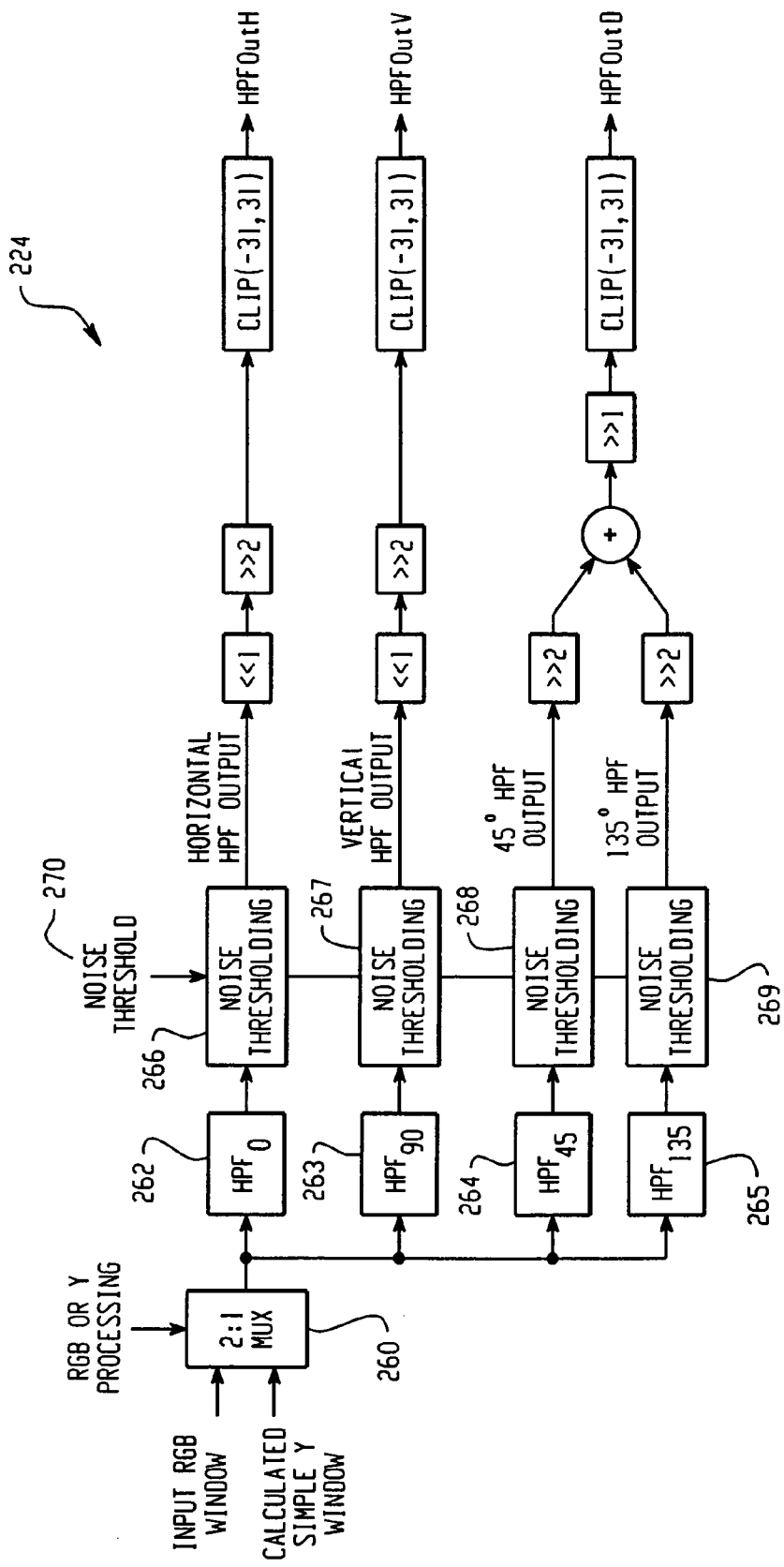
FIG. 8 is a block diagram of an example high pass filter and noise thresholding component.

FIG. 8 is a block diagram of an example high pass filter and noise thresholding component 224. The component 224 includes a 2:1 multiplexer 260, four 3×3 directional high pass filters (HPFs) 262-265, and four noise filters 266-269. The multiplexer 262 selects either a grayscale (Y) or RGB component signal for processing, as described above. The four 3×3 directional HPFs extract horizontal (0°), vertical (90°) and diagonal (45° and 135°) detail information from the selected RGB or Y signal. Example filter matrices for the horizontal ($h_0$), vertical ($h_{90}$) and vertical ($h_{45}$ and $h_{135}$) filters are set forth below.

$$h_0 = \begin{bmatrix} 0 & -1 & 0 \\ 0 & 2 & 0 \\ 0 & -1 & 0 \end{bmatrix} \Big/ 2 \quad h_{90} = \begin{bmatrix} 0 & 0 & 0 \\ -1 & 2 & -1 \\ 0 & 0 & 0 \end{bmatrix} \Big/ 2$$

$$h_{45} = \begin{bmatrix} -1 & 0 & 0 \\ 0 & 2 & 0 \\ 0 & 0 & -1 \end{bmatrix} \Big/ 2 \quad h_{135} = \begin{bmatrix} 0 & 0 & -1 \\ 0 & 2 & 0 \\ -1 & 0 & 0 \end{bmatrix} \Big/ 2$$

All of the HPF coefficients in the above matrices are a power of 2 so that implementation of the multiplication may be performed with simple bit shifts. In addition, all of the filters are designed to be high-pass in one direction and all-pass in the orthogonal direction. It should be understood, however, that other filter designs could also be used.

The HPF outputs are filtered by the noise thresholding components 266-269 to reject noise. The noise rejection threshold operation sets to zero any HPF output having a magnitude that is less than a user-defined noise threshold 270. If the HPF output is above the noise threshold 270, then the HPF magnitude is left unchanged.

After thresholding, the directional HPFs are divided by 4 (e.g., shifted by 2) to generate the horizontal, vertical and diagonal filtered outputs (HPFOutH, HPFOutV and HPFOutD). In addition, the outputs are clipped to between 31 and −31 to reduce the implementation size of the downstream components.

Figure 9:
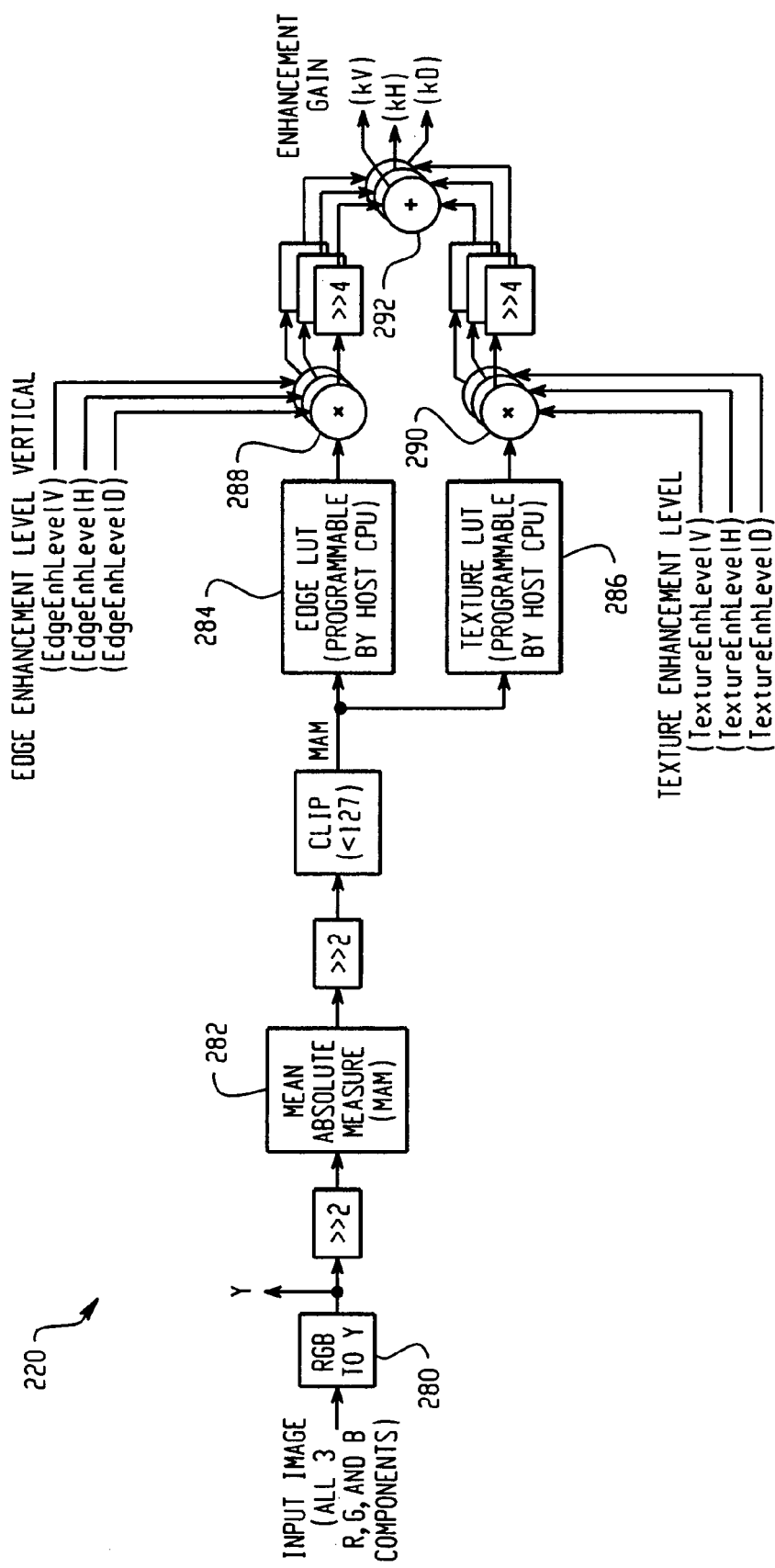
FIG. 9 is a block diagram of an example enhancement gain control component.

FIG. 9 is a block diagram of an example enhancement gain control component 220. The enhancement gain control component 220 generates the gains (kV, kH, kD) that are used to perform the amplification/enhancement of the HPF outputs. All three R, G and B channels use the same k values for enhancement, and thus the enhancement gain control component 220 need only be implemented once for all three RGB channels. The image enhancement function performed by the enhancement gain control component 220 is an adaptive scheme that depends on six user enhancement gain settings (3 edge enhancement settings and 3 texture enhancement settings) and a mean absolute measure (MAM) calculation.

In operation, the enhancement gain control component 220 receives the three RGB component video signals and converts the component images to a grayscale (Y) image using an RGB to Y converter 280. The Y image may, for example, be calculated as follows.

$$Y = \frac{5G + B + 2R}{8}$$

The grayscale image (Y) is bit shifted and input to a mean absolute measure (MAM) component 282, which performs the following calculation.

$$MAM = \sum_{i,j \in [1,3]} |Y(i,j) - \overline{Y}|$$

In the above equation, "$\overline{Y}$" is the weighted mean of the current Y input window. A weighted mean is used as opposed to a pure mean to reduce implementation complexity. The weighted mean, $\overline{Y}$, may be calculated using the weight mask:

$$W = \begin{bmatrix} 1 & 2 & 1 \\ 2 & 4 & 2 \\ 1 & 2 & 1 \end{bmatrix} \Big/ 16.$$

The calculated MAM value is bit shifted and clipped to limit bit widths and is input to an edge look-up table (LUT) 284 and a texture look-up table (LUT) 286, which distinguish edge pixels from texture pixels. The edge and texture LUTs 284, 286 may, for example, be programmed by a host CPU, and may include values that are derived through experimentation to achieve an acceptable level of detail enhancement. Example default values for the edge and texture LUTs 284, 286 are as follows.

| Edge Enhancement LUT | |
|---|---|
| <5 | 0 |
| <10 | 1 |
| <20 | 1 |
| <35 | 8 |
| <50 | 11 |
| <65 | 10 |
| <85 | 9 |
| <95 | 6 |
| >=95 | 2 |

| Texture Enhancement LUT | |
|---|---|
| <5 | 1 |
| <10 | 4 |
| <20 | 4 |
| <35 | 0 |
| <50 | 0 |
| <65 | 0 |
| <85 | 0 |
| <95 | 0 |
| >=95 | 0 |

The outputs of the LUTs 284, 286 are multiplied by the respective edge and texture enhancement gain settings by multiplication components 288, 290. The output of the multiplication components 288, 290 is bit shifted and combined by one or more summation components 292 to generate the enhancement gain values (kV, kH, kD).

This written description uses examples to disclose the invention, including the best mode, and also to enable a person skilled in the art to make and use the invention. The patentable scope of the invention may include other examples that occur to those skilled in the art.

The invention claimed is:

1. A video enhancement system, comprising:
    one or more filters that receive a video signal and filter the video signal to generate a vertical filtered output, a horizontal filtered output and a diagonal filtered output;
    one or more amplification components that apply separate gains to each of the vertical, horizontal and diagonal filtered outputs to generate a vertical enhancement signal, a horizontal enhancement signal and a diagonal enhancement signal;
    one or more summation components that combine the vertical, horizontal and diagonal enhancement signals with the video signal to generate an enhanced video signal; and an enhancement gain control element that generates the vertical, horizontal and diagonal gains based on one or more edge enhancement level inputs and one or more texture enhancement level inputs.

2. The system of claim 1, further comprising:
a first summation component that combines the vertical, horizontal and diagonal enhancement signals to generate a combined enhancement signal; and
a second summation component that combines the combined enhancement signal with the video signal to generate an enhanced video signal.

3. The system of claim 2, wherein the video signal is a R (red) component of a video image, further comprising:
one or more G (green) channel filters that receive a G component of the video image and filter the G component to generate a G channel vertical filtered output, a G channel horizontal filtered output and a G channel diagonal filtered output;
one or more G channel amplification components that apply gains to the G channel vertical, G channel horizontal and G channel diagonal filtered outputs to generate a G channel vertical enhancement signal, a G channel horizontal enhancement signal and a G channel diagonal enhancement signal;
a first G channel summation component that combines the G channel vertical, horizontal and diagonal enhancement signals to generate a combined G channel enhancement signal;
a second G channel summation component that combines the G channel combined enhancement signal with the G component to generate an enhanced G channel video signal;
one or more B (blue) channel filters that receive a B component of the video image and filter the B component to generate a B channel vertical filtered output, a B channel horizontal filtered output and a B channel diagonal filtered output;
one or more B channel amplification components that apply gains to the B channel vertical, B channel horizontal and B channel diagonal filtered outputs to generate a B channel vertical enhancement signal, a B channel horizontal enhancement signal and a B channel diagonal enhancement signal;
a first B channel summation component that combines the B channel vertical, horizontal and diagonal enhancement signals to generate a combined B channel enhancement signal; and
a second B channel summation component that combines the B channel combined enhancement signal with the B component to generate an enhanced B channel video signal.

4. The system of claim 3, wherein the same gains are applied by the one or more amplification components, one or more G channel amplification components and one or more B channel amplification components.

5. The system of claim 1, wherein the one or more filters are high pass filters.

6. The system of claim 1, wherein the one or more amplification components applies a vertical gain to the vertical filtered output, a horizontal gain to the horizontal filtered output and a diagonal gain to the diagonal filtered output.

7. The system of claim 6, wherein the vertical, horizontal and diagonal gains are generated based on one or more enhancement level inputs.

8. The system of claim 1, wherein the enhancement gain control element receives a video image input and distinguishes edge portions from texture portions in the video image input, and wherein the enhancement gain control element applies separate gains to the edge portions and the texture portions based on the one or more edge enhancement level inputs and the one or more texture enhancement level inputs.

9. The system of claim 8, wherein the enhancement gain control element uses a contrast measure to distinguish edge portions from texture portions.

10. The system of claim 9, wherein the enhancement gain control element converts the received video image input into a grayscale signal and performs the contrast measure on the grayscale signal to distinguish edge portions from texture portion.

11. The system of claim 9, wherein the contrast measure is a mean absolute measure.

12. The system of claim 9, wherein the enhancement gain control element compares the contrast measure with values in one or more look-up tables to distinguish edge portions from texture portions.

13. The system of claim 1, further comprising an overshoot control element that filters the enhanced video signal based on one or more overshoot or undershoot threshold values.

14. The system of claim 13, wherein the one or more overshoot or undershoot threshold values include an edge overshoot threshold and a texture overshoot threshold.

15. The system of claim 1, wherein the video signal is selected from a grayscale signal or an RGB component video signal based on a user input.

16. A method of enhancing a video signal, comprising:
filtering the video signal to generate a vertical filtered signal, a horizontal filtered signal and a diagonal filtered signal;
receiving one or more enhancement level inputs that include one or more edge enhancement level inputs and one or more texture enhancement level inputs;
generating separate gains based on the enhancement level inputs;
applying the separate gains to each of the vertical filtered signal, horizontal filtered signal and diagonal filtered signal; and
summing the vertical filtered signal, horizontal filtered signal and diagonal filtered signal with the video signal to generate an enhanced video signal.

17. The method of claim 16, further comprising:
distinguishing edge portions from texture portions in the video signal;
amplifying the edge portions based on the one or more edge enhancement level input; and
amplifying the texture portions based on the one or more texture enhancement level input.

18. The method of claim 17, further comprising:
converting the video signal to a grayscale signal;
wherein the edge portions are distinguished from the texture portions in the grayscale signal.

19. The method of claim 17, wherein a contrast measure is used to distinguish the edge portions from the texture portions.

20. The method of claim 16, further comprising:
filtering the enhanced video signal based one or more overshoot or undershoot threshold values.

21. The method of claim 16, further comprising:
receiving a component video signal and a grayscale signal; and
selecting either the component video signal or the grayscale signal as the video signal.

22. A video enhancement system comprising:
means for filtering a video signal to generate a vertical filtered signal, a horizontal filtered signal and a diagonal filtered signal;
means for applying separate gains to each of the vertical filtered signal, horizontal filtered signal and diagonal filtered signal;
means for summing the vertical filtered signal, horizontal filtered signal and diagonal filtered signal with the video signal to generate an enhanced video signal; and
means for filtering the enhanced video signal based one or more overshoot or undershoot threshold values.

23. The system of claim 22, further comprising:
means receiving one or more enhancement level inputs; and
means for generating the separate gains based on the enhancement level inputs.

24. The system of claim 23, wherein the one or more enhancement level inputs include one or more edge enhancement level input and one or more texture enhancement level input.

25. The system of claim 24, further comprising:
means for distinguishing edge portions from texture portions in the video signal;
means for amplifying the edge portions based on the one or more edge enhancement level input; and
means for amplifying the texture portions based on the one or more texture enhancement level input.

26. A video enhancement system, comprising:
one or more filters that receive a video signal and filter the video signal to generate a vertical filtered output, a horizontal filtered output and a diagonal filtered output;
one or more amplification components that apply separate gains to each of the vertical, horizontal and diagonal filtered outputs to generate a vertical enhancement signal, a horizontal enhancement signal and a diagonal enhancement signal;
one or more summation components that combine the vertical, horizontal and diagonal enhancement signals with the video signal to generate an enhanced video signal; and
an overshoot control element that filters the enhanced video signal based on one or more overshoot or undershoot threshold values.

27. The system of claim 26, further comprising:
a first summation component that combines the vertical, horizontal and diagonal enhancement signals to generate a combined enhancement signal; and
a second summation component that combines the combined enhancement signal with the video signal to generate an enhanced video signal.

28. The system of claim 27, wherein the video signal is a R (red) component of a video image, further comprising:
one or more G (green) channel filters that receive a G component of the video image and filter the G component to generate a G channel vertical filtered output, a G channel horizontal filtered output and a G channel diagonal filtered output;
one or more G channel amplification components that apply gains to the G channel vertical, G channel horizontal and G channel diagonal filtered outputs to generate a G channel vertical enhancement signal, a G channel horizontal enhancement signal and a G channel diagonal enhancement signal;
a first G channel summation component that combines the G channel vertical, horizontal and diagonal enhancement signals to generate a combined G channel enhancement signal;
a second G channel summation component that combines the G channel combined enhancement signal with the G component to generate an enhanced G channel video signal;
one or more B (blue) channel filters that receive a B component of the video image and filter the B component to generate a B channel vertical filtered output, a B channel horizontal filtered output and a B channel diagonal filtered output;
one or more B channel amplification components that apply gains to the B channel vertical, B channel horizontal and B channel diagonal filtered outputs to generate a B channel vertical enhancement signal, a B channel horizontal enhancement signal and a B channel diagonal enhancement signal;
a first B channel summation component that combines the B channel vertical, horizontal and diagonal enhancement signals to generate a combined B channel enhancement signal; and
a second B channel summation component that combines the B channel combined enhancement signal with the B component to generate an enhanced B channel video signal.

29. The system of claim 28, wherein the same gains are applied by the one or more amplification components, one or more G channel amplification components and one or more B channel amplification components.

30. The system of claim 26, wherein the one or more filters are high pass filters.

31. The system of claim 26, wherein the one or more amplification components applies a vertical gain to the vertical filtered output, a horizontal gain to the horizontal filtered output and a diagonal gain to the diagonal filtered output.

32. The system of claim 31, wherein the vertical, horizontal and diagonal gains are generated based on one or more enhancement level inputs.

33. The system of claim 26, wherein the one or more overshoot or undershoot threshold values include an edge overshoot threshold and a texture overshoot threshold.

34. A video enhancement system, comprising:
one or more filters that receive a video signal and filter the video signal to generate a vertical filtered output, a horizontal filtered output and a diagonal filtered output, wherein the video signal is selected from a grayscale signal or an RGB component video signal based on a user input;
one or more amplification components that apply separate gains to each of the vertical, horizontal and diagonal filtered outputs to generate a vertical enhancement signal, a horizontal enhancement signal and a diagonal enhancement signal; and
one or more summation components that combine the vertical, horizontal and diagonal enhancement signals with the video signal to generate an enhanced video signal.

35. The system of claim 34, further comprising:
a first summation component that combines the vertical, horizontal and diagonal enhancement signals to generate a combined enhancement signal; and
a second summation component that combines the combined enhancement signal with the video signal to generate an enhanced video signal.

36. The system of claim 35, wherein the video signal is a R (red) component of a video image, further comprising:
- one or more G (green) channel filters that receive a G component of the video image and filter the G component to generate a G channel vertical filtered output, a G channel horizontal filtered output and a G channel diagonal filtered output;
- one or more G channel amplification components that apply gains to the G channel vertical, G channel horizontal and G channel diagonal filtered outputs to generate a G channel vertical enhancement signal, a G channel horizontal enhancement signal and a G channel diagonal enhancement signal;
- a first G channel summation component that combines the G channel vertical, horizontal and diagonal enhancement signals to generate a combined G channel enhancement signal;
- a second G channel summation component that combines the G channel combined enhancement signal with the G component to generate an enhanced G channel video signal;
- one or more B (blue) channel filters that receive a B component of the video image and filter the B component to generate a B channel vertical filtered output, a B channel horizontal filtered output and a B channel diagonal filtered output;
- one or more B channel amplification components that apply gains to the B channel vertical, B channel horizontal and B channel diagonal filtered outputs to generate a B channel vertical enhancement signal, a B channel horizontal enhancement signal and a B channel diagonal enhancement signal;
- a first B channel summation component that combines the B channel vertical, horizontal and diagonal enhancement signals to generate a combined B channel enhancement signal; and
- a second B channel summation component that combines the B channel combined enhancement signal with the B component to generate an enhanced B channel video signal.

37. The system of claim 36, wherein the same gains are applied by the one or more amplification components, one or more G channel amplification components and one or more B channel amplification components.

38. The system of claim 34, wherein the one or more filters are high pass filters.

39. The system of claim 34, wherein the one or more amplification components applies a vertical gain to the vertical filtered output, a horizontal gain to the horizontal filtered output and a diagonal gain to the diagonal filtered output.

40. The system of claim 39, wherein the vertical, horizontal and diagonal gains are generated based on one or more enhancement level inputs.

41. The system of claim 34, further comprising:
- an enhancement gain control element that generates the vertical, horizontal and diagonal gains based on one or more edge enhancement level inputs and one or more texture enhancement level inputs.

42. The system of claim 41, wherein the enhancement gain control element receives a video image input and distinguishes edge portions from texture portions in the video image input, and wherein the enhancement gain control element applies separate gains to the edge portions and the texture portions based on the one or more edge enhancement level inputs and the one or more texture enhancement level inputs.

43. The system of claim 42, wherein the enhancement gain control element uses a contrast measure to distinguish edge portions from texture portions.

44. The system of claim 43, wherein the enhancement gain control element converts the received video image input into a grayscale signal and performs the contrast measure on the grayscale signal to distinguish edge portions from texture portion.

45. The system of claim 43, wherein the contrast measure is a mean absolute measure.

46. The system of claim 43, wherein the enhancement gain control element compares the contrast measure with values in one or more look-up tables to distinguish edge portions from texture portions.

47. The system of claim 34, further comprising an overshoot control element that filters the enhanced video signal based on one or more overshoot or undershoot threshold values.

48. The system of claim 47, wherein the one or more overshoot or undershoot threshold values include an edge overshoot threshold and a texture overshoot threshold.

49. A method of enhancing a video signal, comprising:
- filtering the video signal to generate a vertical filtered signal, a horizontal filtered signal and a diagonal filtered signal;
- applying separate gains to each of the vertical filtered signal, horizontal filtered signal and diagonal filtered signal;
- summing the vertical filtered signal, horizontal filtered signal and diagonal filtered signal with the video signal to generate an enhanced video signal; and
- filtering the enhanced video signal based one or more overshoot or undershoot threshold values.

50. The method of claim 49, further comprising:
- receiving one or more enhancement level inputs; and
- generating the separate gains based on the enhancement level inputs.

51. The method of claim 50, wherein the one or more enhancement level inputs include one or more edge enhancement level input and one or more texture enhancement level input.

52. The method of claim 51, further comprising:
- distinguishing edge portions from texture portions in the video signal;
- amplifying the edge portions based on the one or more edge enhancement level input; and
- amplifying the texture portions based on the one or more texture enhancement level input.

53. The method of claim 52, further comprising:
- converting the video signal to a grayscale signal;
- wherein the edge portions are distinguished from the texture portions in the grayscale signal.

54. The method of claim 52, wherein a contrast measure is used to distinguish the edge portions from the texture portions.

55. The method of claim 49, further comprising:
- receiving a component video signal and a grayscale signal; and
- selecting either the component video signal or the grayscale signal as the video signal.

56. A method of enhancing a video signal, comprising:
- receiving a component video signal and a grayscale signal;
- selecting either the component video signal or the grayscale signal as the video signal;
- filtering the video signal to generate a vertical filtered signal, a horizontal filtered signal and a diagonal filtered signal;

applying separate gains to each of the vertical filtered signal, horizontal filtered signal and diagonal filtered signal; and summing the vertical filtered signal, horizontal filtered signal and diagonal filtered signal with the video signal to generate an enhanced video signal.

57. The method of claim 56, further comprising:
receiving one or more enhancement level inputs; and
generating the separate gains based on the enhancement level inputs.

58. The method of claim 57, wherein the one or more enhancement level inputs include one or more edge enhancement level input and one or more texture enhancement level input.

59. The method of claim 58, further comprising:
distinguishing edge portions from texture portions in the video signal;
amplifying the edge portions based on the one or more edge enhancement level input; and
amplifying the texture portions based on the one or more texture enhancement level input.

60. The method of claim 59, further comprising:
converting the video signal to a grayscale signal;
wherein the edge portions are distinguished from the texture portions in the grayscale signal.

61. The method of claim 59, wherein a contrast measure is used to distinguish the edge portions from the texture portions.

62. The method of claim 56, further comprising:
filtering the enhanced video signal based one or more overshoot or undershoot threshold values.

* * * * *